United States Patent
Gerstenberger et al.

(10) Patent No.: US 6,317,651 B1
(45) Date of Patent: Nov. 13, 2001

(54) TRAJECTORY GENERATION SYSTEM

(75) Inventors: Michael D. Gerstenberger, Lake Orion; David M. Martin, Clarkston; Khalid Mirza, Rochester Hills, all of MI (US); El-Houssaine Waled, Windsor (CA)

(73) Assignee: Kuka Development Laboratories, Inc., Rochester Hills, MI (US)

( * ) Notice: Subject to any disclaimer, the term of this patent is extended or adjusted under 35 U.S.C. 154(b) by 0 days.

(21) Appl. No.: 09/276,880

(22) Filed: Mar. 26, 1999

(51) Int. Cl.[7] .................................................. G06F 19/00
(52) U.S. Cl. ................................................................ 700/245
(58) Field of Search .................................. 700/245, 251, 700/262, 263

(56) References Cited

U.S. PATENT DOCUMENTS

| | | | |
|---|---|---|---|
| 4,243,923 | * | 1/1981 | Whitney et al. ..................... 318/561 |
| 4,604,716 | * | 8/1986 | Kato et al. ........................... 700/251 |
| 4,887,222 | * | 12/1989 | Miyake et al. ....................... 700/262 |
| 5,159,249 | * | 10/1992 | Megherbi ............................ 318/568.1 |
| 5,435,489 | * | 7/1995 | Cheng et al. ....................... 318/568.15 |
| 5,481,111 | * | 1/1996 | Rosar et al. ......................... 250/311 |
| 6,092,004 | * | 7/2000 | Harima ................................. 700/252 |

OTHER PUBLICATIONS

Marsh, "Structure of Measurement Jacobian Matrices for Power Systems", IEE Proceedings, vol. 136, Pt. C, No. 6, pp. 407–413, Nov. 1989.*

* cited by examiner

*Primary Examiner*—William A. Cuchlinski, Jr.
*Assistant Examiner*—Thu Nguyen
(74) *Attorney, Agent, or Firm*—Harness, Dickey & Pierce, P.L.C.

(57) ABSTRACT

A trajectory generation system is provided for operating a robot in response to a motion command. The robot is a multi-jointed manipulator with an end-effector that traverses a trajectory. A Cartesian trajectory generator converts the motion command into a requested Cartesian positions vector and a requested Cartesian velocities vector. A Jacobian matrix of the manipulator defines the relationship between the manipulator joint velocities vector and the manipulator Cartesian velocities vector. A requested joint velocities vector is computed from the requested Cartesian velocities vector by way of the inverse of the Jacobian matrix. The requested joint velocities vector defines a planned state vector for the manipulator.

12 Claims, 6 Drawing Sheets

TRAJECTORY GENERATION SYSTEM

BACKGROUND AND SUMMARY OF THE INVENTION

The present invention relates generally to control methods and systems for robotic manipulators. More particularly, the invention relates to a system for generating robotic manipulator trajectories.

Performing Cartesian control of robotic manipulators involves interpolating a Cartesian trajectory (position, velocity and acceleration) and converting this Cartesian trajectory into an equivalent joint space state. The position conversion is performed using the inverse kinematics mapping of the manipulator. However, the conventional method of computing the joint velocities is by taking the difference between consecutive joint positions and dividing it by the interpolation period. This approach inherently jeopardizes path accuracy at low servo update rates and high accelerations. Furthermore, it can produce non-smooth trajectories.

Therefore, it is an object of the present invention to generate robotic system trajectories with improved accuracy.

Additionally, it is an object of the present invention to generate smooth trajectories for a robotic system.

The present invention provides a trajectory generation system to operate a robot in response to a motion command. The robot is a multi-jointed manipulator with an end-effector that traverses a trajectory. A Cartesian trajectory generator converts the motion command into a requested Cartesian positions vector and a requested Cartesian velocities vector. A Jacobian matrix of the manipulator defines the relationship between the manipulator joint velocities vector and the manipulator Cartesian velocities vector. A requested joint velocities vector is computed from the requested Cartesian velocities vector by means of the inverse of the Jacobian matrix. A requested joint positions vector is computed from the requested Cartesian velocities vector by means of inverse kinematics. The requested joint velocities vector and requested joint positions vector define a planned state vector for the manipulator.

For a more complete understanding of the invention, its objectives and advantages, refer to the following specification and to the accompanying drawings.

DESCRIPTION OF THE PREFERRED EMBODIMENT

Figure 1:
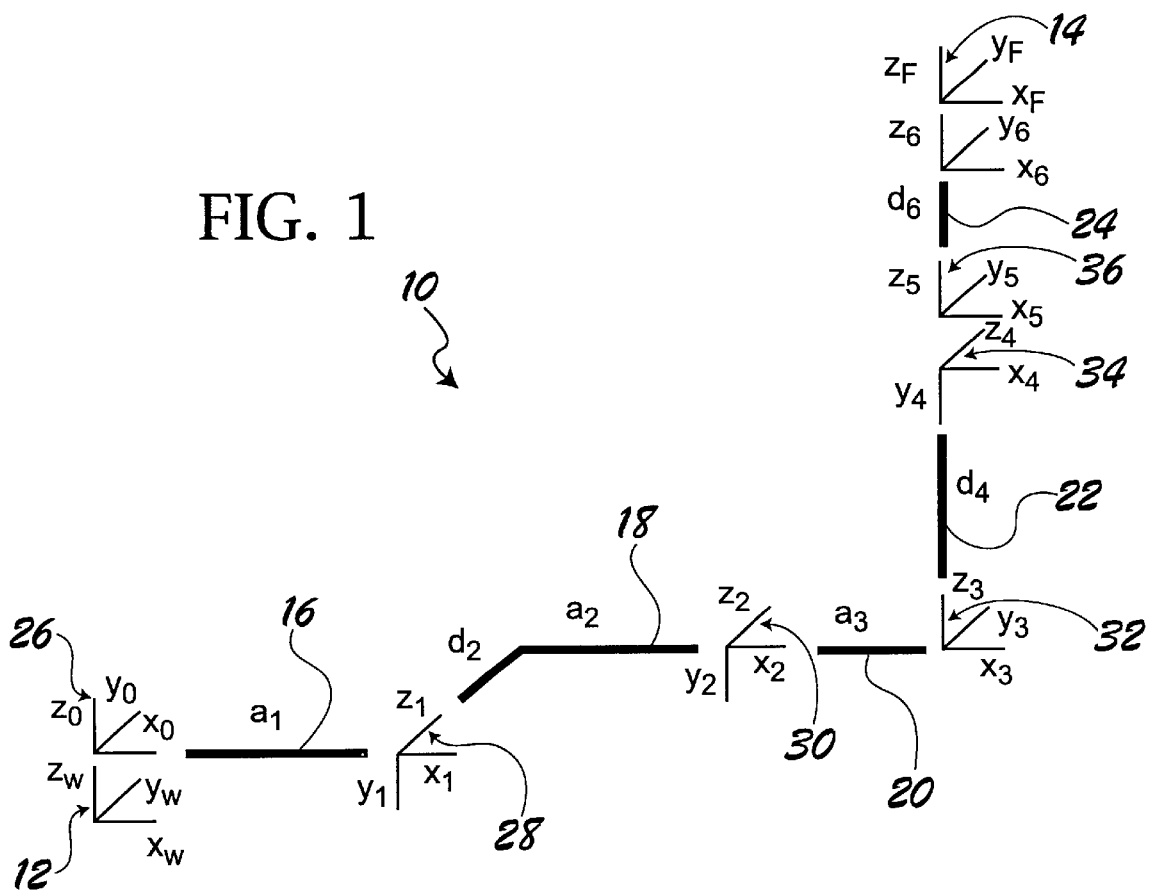
FIG. 1 is a two-dimensional view of a stick figure representation of a robotic manipulator.

Illustrated in FIG. 1 is a typical multi-jointed robotic manipulator 10 having six degrees of freedom. The manipulator 10 extends from a base end 12 to an end effector (not shown) connected to a flange 14. Links 16, 18, 20, 22, and 24 are coupled from the base end 12 to the flange 14 by joints 26, 28, 30, 32, 34, and 36. The manipulator is generally controlled by a motion system that includes hardware and software components for computing trajectories and inputting and displaying data. The joints are represented by $z0$ through $z5$. The flange is represented by subscript "F" and the base is represented by subscript "W".

The position and orientation of the end effector are typically described relative to some convenient coordinate system. For example, for the manipulator 10 it might be convenient to use a fixed Cartesian coordinate system having an origin at a desired location, an x-axis and a y-axis which define a horizontal plane parallel to the base end 12, and a z-axis perpendicular to the horizontal plane.

Use of Cartesian Position and Velocity

Figure 2:
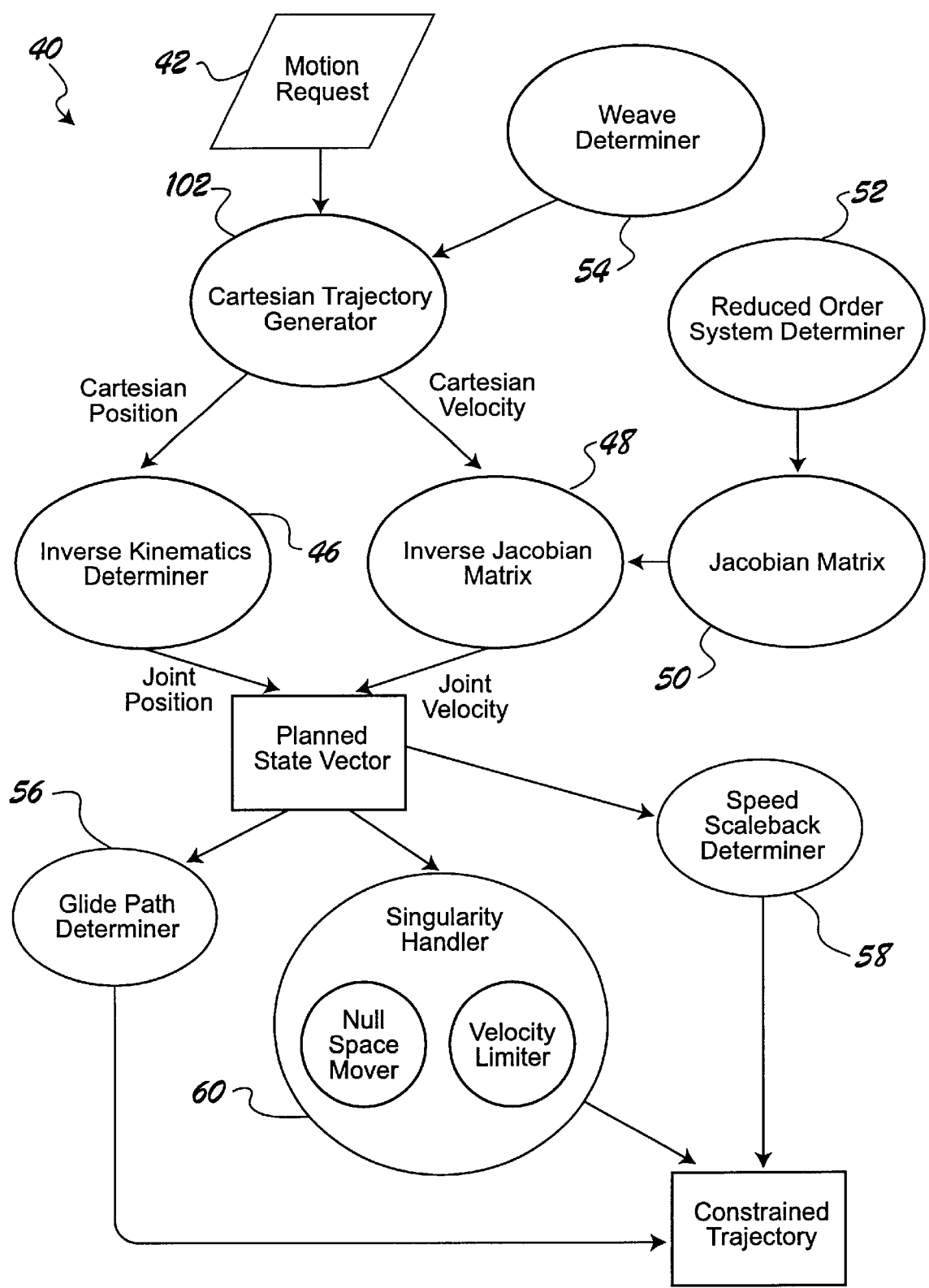
FIG. 2 is an entity relationship diagram of the components of the presently preferred embodiment.
Figure 7A:
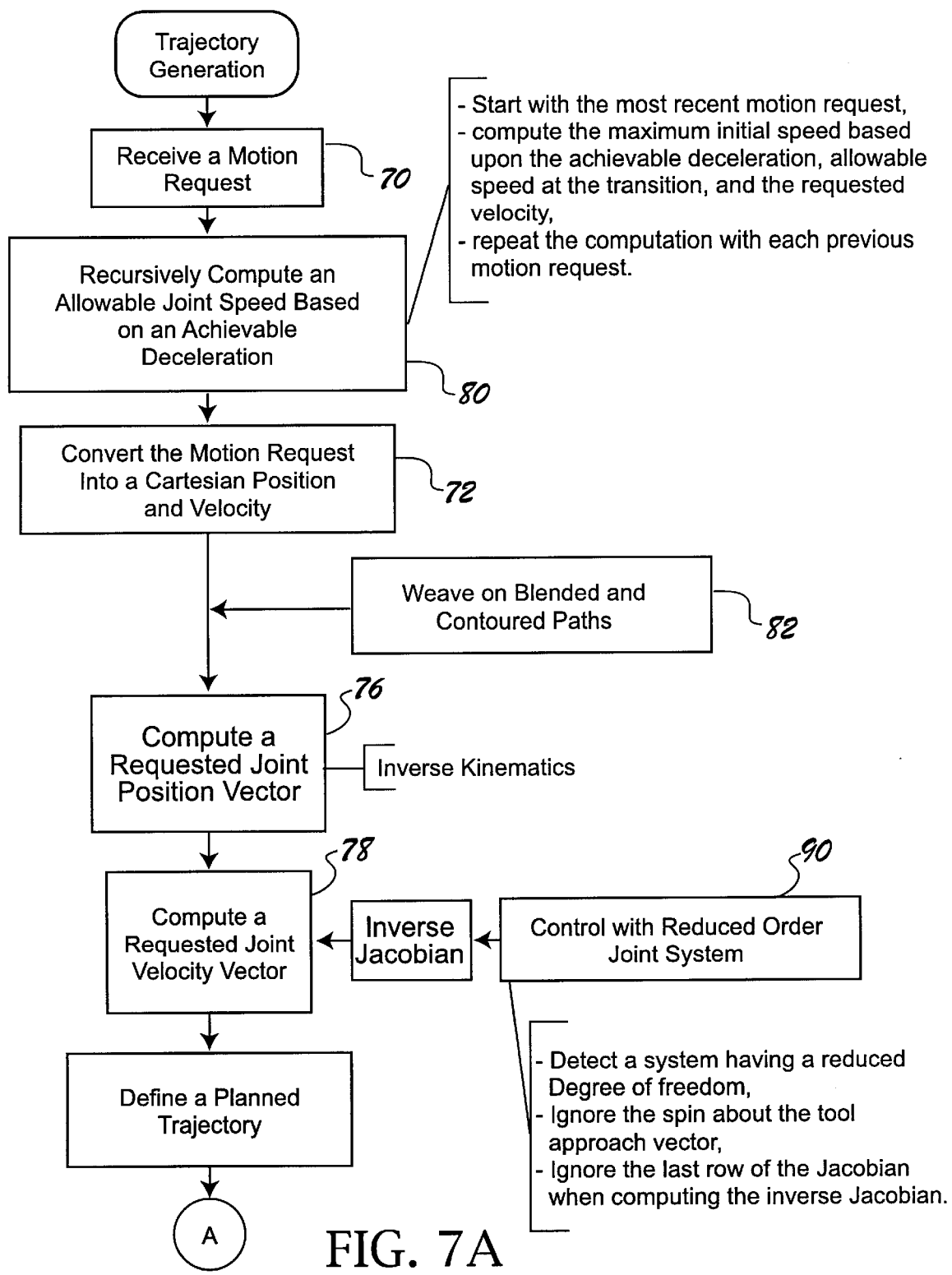
FIGS. 7A–7B is a flow chart illustrating an embodiment of the trajectory generation system.
Figure 7B:
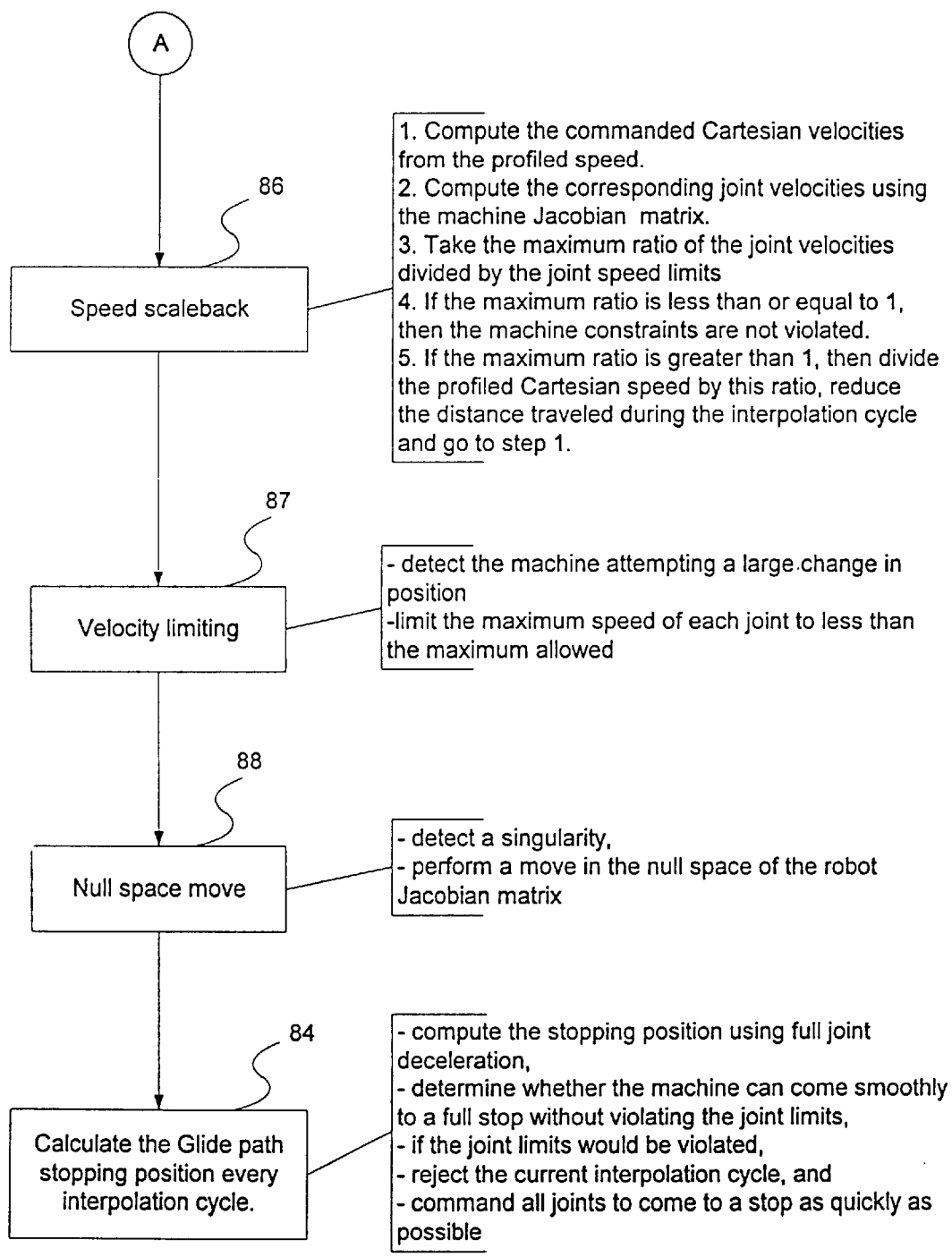

Referring to FIG. 2, the presently preferred embodiment of the trajectory generation system 40 is diagrammatically shown. Referring to FIG. 7 in addition to FIG. 2, the process of generating a trajectory is illustrated. At step 70 a Cartesian Trajectory Generator 44 receives a motion request 42 directing that the end effector execute a specific motion. The Cartesian Trajectory Generator 44 converts the motion request 42 into a requested Cartesian state vector that is comprised of a requested Cartesian velocity vector and a requested Cartesian position vector, steps 72. At step 76, an Inverse Kinematics determiner 46 computes an equivalent requested joint position vector from the requested Cartesian position vector. To compute a joint velocity vector directly from the requested Cartesian velocity vector an inverse Jacobian matrix 48 representing the manipulator configuration is derived. The scope of the invention includes pseudo-inverse matrices as well as exact inverses of the Jacobian. The manipulator Jacobian matrix 50, from which the inverse is derived, relates the joint velocities to Cartesian velocities at a given configuration:

$$\dot{X} = J\dot{q}$$

where $\dot{X}$ is the vector of Cartesian velocities and $\dot{q}$ is the vector of joint velocities. At step 78 the requested joint velocity vector is computed using the inverse Jacobian matrix 48. This method results in improved path accuracy at low servo update rates if the servo system is capable of receiving position and velocity state vectors and interpolating from one state vector to the next.

Reduced Order Determiner 52

To position a robot end-effector at an arbitrary location and orientation in space, it is necessary that the inverse Jacobian can be computed. To compute the inverse Jacobian the Jacobian matrix representing the manipulator must be square. The Jacobian matrix of a robotic manipulator is the matrix that defines the relationship between the joint velocities and Cartesian velocities. The vector of joint velocities is comprised of n elements, where n is the number of joints in the robot. In the presently preferred embodiment of the invention the vector of Cartesian velocities is comprised of 6 elements, 3 translational and 3 rotational velocities. For a robot having 6 joints the Jacobian is square, the number of rows is equal to the number of columns, and generally there is a one-to-one relationship between joint and Cartesian velocities. However, when a robot is in a singular configuration one degree of freedom is lost, resulting in a Jacobian matrix that is not invertible, sometimes resulting in an over-determined system.

Another example of an over-determined system would be manipulators having only 5 joints, wherein control can be exerted only over five degrees of freedom. The Jacobian representing a 5 joint manipulator is a 6×5 matrix. In other words, a 5 joint manipulator is an over-determined system. Similarly, 4 joint and 3 joint manipulators. To compute an inverse of a 6×5 Jacobian, one degree of freedom must be ignored. In the presently preferred embodiment of the trajectory generator, the spin about the tool approach vector is not controlled, however the scope of the invention includes not controlling other state variables. The trajectory generator controls the tool approach vector, which represents 2 degrees of freedom and the Cartesian location (x, y, and z).

Ignoring the spin about the tool vector can be achieved by considering the Cartesian velocities and Jacobian matrix in the tool frame:

$$^{Tool}\begin{pmatrix} \dot{x} \\ \dot{y} \\ \dot{z} \\ \dot{w}_x \\ \dot{w}_y \\ \dot{w}_z \end{pmatrix}_{Tool} = {}^{Tool}J_{Tool} \begin{pmatrix} \dot{q}_1 \\ \dot{q}_2 \\ \dot{q}_3 \\ \dot{q}_4 \\ \dot{q}_5 \end{pmatrix}$$

where J represents the robot Jacobian and $q_i$ represents the joint i variable. It can be seen directly that WZ represents the spin of the tool frame about the tool approach vector. At step 90 (FIG. 7B), ignoring this spin, along with the last row of the Jacobian results in a system of 5 equations and 5 unknowns that is consistent with controlling the tool approach vector and location in space.

Weave Determiner 54

Figure 4:
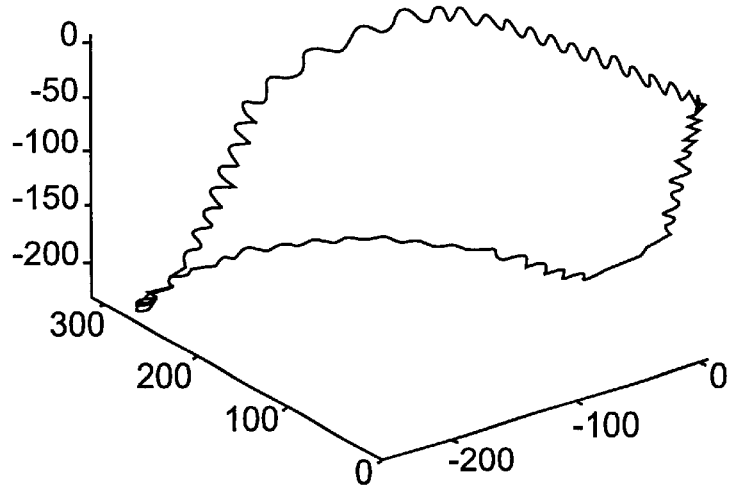
FIG. 4 is a three dimensional graph of a complex path having a superposed waveform.
Figure 3:
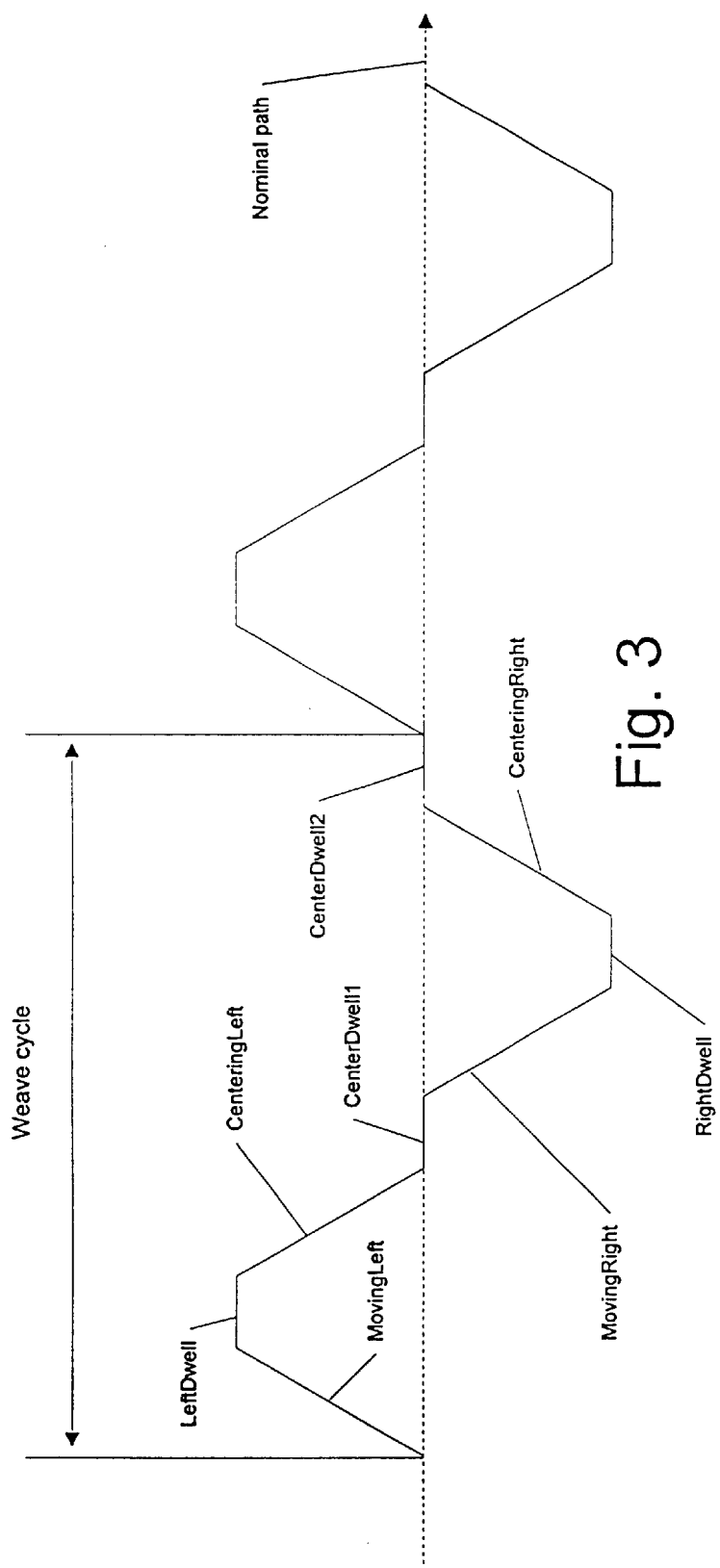
FIG. 3 is a waveform diagram illustrating a trapezoidal waveform used for weaving.

The presently preferred embodiment of the invention allows weaving on complex path shapes as well as on blended moves. Weaving is the operation of superposing a wave form on the nominal robot path (illustrated in FIGS. 3 and 4). A weave direction is computed from the tool approach vector and the nominal path direction. When dealing with linear Cartesian moves, the path direction does not change and the weave direction stays constant along the path. However, when dealing with contoured paths, such as blends or spline segments, the path direction changes dynamically. A mechanism is required that allows the weave direction along the path to be changed so that it stays perpendicular to the path. To achieve this a rotation matrix is computed to permit a transformation from the previous path direction to the new path direction. An angle-axis approach is employed to compute the rotation matrix. At step 82, the axis of rotation is determined by the following cross product:

K=PrevPath×CurrPath

Figure 5:
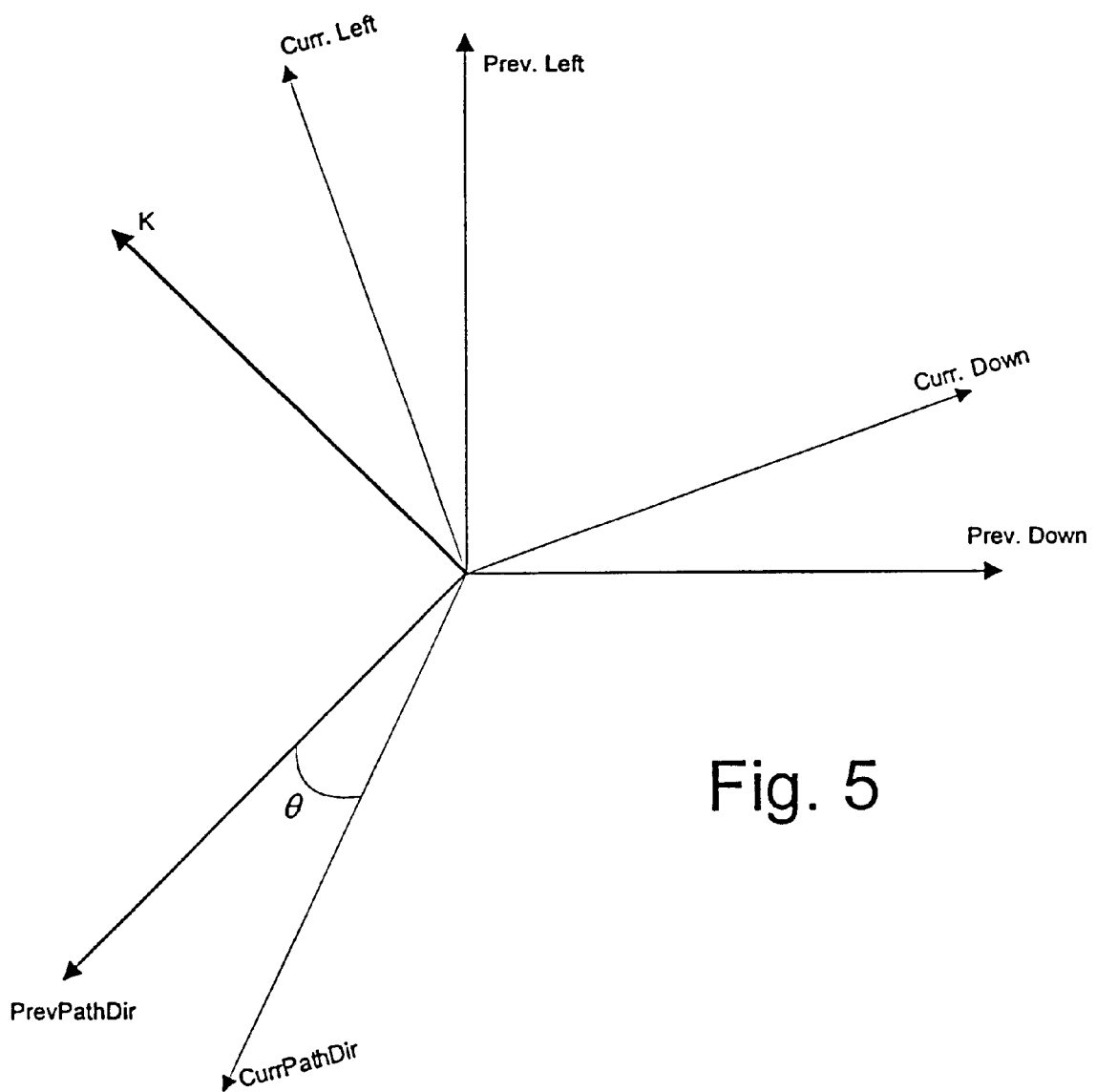
FIG. 5 is a three dimensional diagram of the relationship of previous and current weave frames.

Referring to FIG. 5, the path directions are obtained by normalizing the Cartesian velocities, they are not computed explicitly. Since the two path directions are unit vectors, the norm of the axis K is equal to sin(θ), where θ is the angle, about K, between PrevPath and CurrPath. This allows the rotation matrix to be computed as follows:

$$R_k(\theta) = \begin{bmatrix} vk_x^2 + c & vk_xk_y - sk_z & vk_xk_z + sk_y \\ vk_xk_y + sk_z & vk_y^2 + c & vk_yk_z - sk_x \\ vk_xk_z - sk_y & vk_yk_z - sk_y & vk_z^2 + c \end{bmatrix}$$

where c=cos(θ), s=sin(θ), v=1-cos(θ) and K=$(k_x k_y k_z)^T$.

The new weave frame is then computed from the previous weave frame by pre-multiplying it by $R_k(\theta)$, ie:

CurrWvFr=$R_k(\theta)$ PrevWvFr

Where CurrWvFr is the current weave frame and PrevWvFr is the previous weave frame.

Glide Path Determiner 56

When performing a Cartesian move, the joints of the machine will follow a non-linear path in joint space. The joint values must remain within predetermined limits throughout the course of a move, it is not sufficient for the initial and end positions to be within the manipulator's workspace. It is possible that during the middle of a move, the kinematics of the machine will drive the joint values to beyond the specified limits, causing a joint limit violation. For example, a manipulator may attempt a circular move where not all of the arc is contained in the workspace. To avoid joint limit violations, the stopping position using full joint deceleration is computed during every interpolation cycle, step 84. Whether the machine can come smoothly to a full stop without violating the joint limits is computed given the machine's actual position, actual velocity, and using joint acceleration limits for the machine. If the computation indicates that the joint limits would be violated, the current interpolation cycle is rejected, and all joints are commanded to come to a stop.

Speed Scaleback Determiner 58

The Jacobian matrix of a robotic manipulator depends, in general, on the configuration of the machine. Hence, the relationship between the Cartesian and joint velocities is non-linear. During a Cartesian linear move, a constant Cartesian speed may translate to joint speeds that are within the joint speed limits at some times and positions, and violate those limits at other times and positions. This is particularly true when the machine approaches a singular configuration during a Cartesian move. In that case, small Cartesian velocities translate into very large joint velocities. The presently preferred embodiment of the invention provides a solution that maintains the path shape while staying within the machine joint speed limit constraints. The solution consists of the following steps in every interpolation period, step 86 of FIG. 7:

1. Compute the commanded Cartesian velocities from the profiled speed.
2. Compute the corresponding joint velocities using the machine Jacobian matrix.
3. Take the maximum ratio of the joint velocities divided by the joint speed limits
4. If the maximum ratio is less than or equal to 1, then the machine constraints are not violated.
5. If the maximum ratio is greater than 1, then divide the profiled Cartesian speed by this ratio, reduce the distance traveled during the interpolation cycle and go to step 1.

In the majority of the cases, one iteration is sufficient to reduce the Cartesian speed to an acceptable level.

Singularity Handler 60

When the technique of speed scaleback fails the first iteration, the machine is most likely in or near a singular configuration. Rather than allow the machine to attempt a large change in position, the joint motions are constrained to be less than a certain maximum given the machine capabilities, step 87. That is, the change in the joint position is limited to:

$$\Delta q = \pm \dot{q}_{max} \Delta t$$

where $\dot{q}_{max}$ is the maximum joint speed and $\Delta t$ is the interpolation period. is effectively a saturation filter or clamping on the maximum change in joint position per interpolation cycle.

The presently preferred embodiment of the invention includes an alternative means of ensuring a smooth transition from one side of a singularity to the other. The embodiment includes a means for performing a move that is in the null space of the robot Jacobian matrix when the machine is in a singular configuration, 88. At a singular configuration, a robotic manipulator loses one or more degrees freedom. This sometimes happens because 2 or more joint axes line up. They effectively become one joint. Attempting to proceed directly through a singularity usually results in one or more joints attempting large, instantaneous moves. Examples of when a singularity occurs include when two or more of a machine's joints are aligned and when the determinant of the Jacobian is approximately zero. To prevent large, instantaneous changes of position, a move is performed that is in the null space of the robot Jacobian matrix when the machine is in a singular configuration. The joints of the machine are moved to appropriate destination values that permit the machine to smoothly exit the singularity. In other words, the joints of the machine are moved in such a way as to keep the Cartesian position of the end effector fixed while changing the joint angles to where they will be when the machine exits the singularity. This results in joint moves that do not affect the end-effector location and orientation. For one example, if a PUMA 560 robot has its joint 5 equal to zero Points 4 and 6 aligned), then a null space move with respect to this position will move joints 4 and 6 in opposite directions so that the end-effector preserves its location and orientation at any instant during the move.

Velocity Back-Propagation

When a path consists of a series of short motion requests, the motion segment may be too small to allow for acceleration to full speed. Consider a case in which three small motion segments have been requested. In order for the machine to safely decelerate to a stop, further assume that the machine must begin decelerating during the second motion segment. This requirement limits the maximum speed achieved during the path, since deceleration must begin during the second motion segment. However, if a fourth motion request is received which has considerable length, it may no longer be necessary to begin decelerating during the second motion segment. As a result, a faster speed along the path can be attained. Therefore, the addition of a new motion segment may change the achievable speeds during previous motion segments. It is therefore necessary to re-examine all previous motion segments when a new motion segment is requested, step 80. This process is called 'Backward Recursion'.

Figure 6:
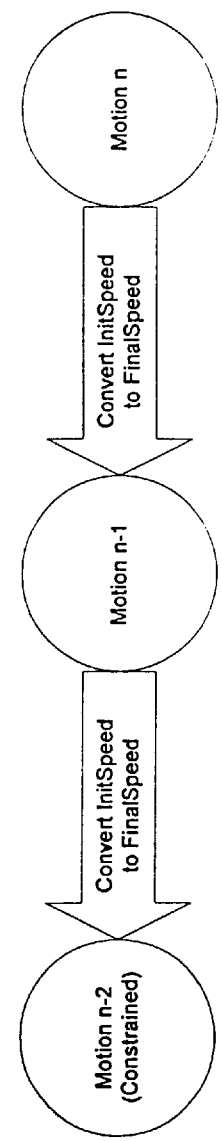
FIG. 6 is a datagram illustrating backward recursion of the computed path velocity.

Referring to FIG. 6, for each motion starting with the most recent request, a maximum initial speed is proposed based on the achievable deceleration, the allowable speed at the transition, and the requested velocity. This proposed speed is then used as the maximum final speed of the previous motion, and the process is repeated. Such a method has the benefit of allowing motions to achieve a higher speed and still decelerate to a stop even though each individual motion segment may be short. This is particularly useful for machine tool programs where entire paths are programmed as a series of short linear motion segments.

The necessary equations for computing the maximum initial speed are based on the particular type of profile for the motion segments. Effectively, the achievable initial speed for the current motion segment is determined based on achieving the requested final speed at full deceleration. This initial speed is set as the maximum final speed of the previous motion after performing a conversion operation for the cases where the speed of the current motion is in different units from the speed of the previous motion.

Note that the backward recursion process is used to determine the maximum achievable final speed as limited by path analysis, the requested speed of the motions, and the required deceleration distance.

While the invention has been described in its presently preferred embodiment, it will be understood that the invention is capable of modification or adaptation without departing from the spirit of the invention as set forth in the appended claims.

What is claimed is:

1. A trajectory generation system to operate a robotic manipulator in response to a motion command, where the manipulator includes an end effector, having a position and an orientation, and a plurality of joints, each joint having a position, velocity and acceleration, the generation system comprising:

a Cartesian trajectory generator operable to convert the motion command into a requested Cartesian positions vector and a requested Cartesian velocities vector;

a Jacobian matrix of the manipulator defining the relationship between a manipulator joint velocities vector and a manipulator Cartesian velocities vector;

an inverse of the Jacobian matrix for transforming the requested Cartesian velocities vector to a requested joint velocities vector;

an inverse kinematics determiner operable to calculate a requested joint positions vector based upon the requested Cartesian positions vector, wherein the requested joint velocities vector and the requested joint positions vector define a planned vector of the manipulator; and a singularity handler activable in response to detecting a singularity, to constrain the motion of the robot manipulator through the singularity such that the joint velocity of each joint of the manipulator does not exceed a predetermined maximum velocity, wherein the singularity handler comprises a null space mover to perform a move in a null space of the Jacobian matrix, such that the aligned joints are moved to appropriate destination values and the position and orientation of the end-effector are not affected.

2. The trajectory generation system of claim 1 wherein the trajectory generation system further comprises a speed scaleback module activable in response to detecting a predicted joint limit violation, to compute a constrained path speed such that the joint velocity of each manipulator joint does not exceed a predetermined maximum velocity and the constrained path maintains the planned trajectory.

3. The trajectory generation system of claim 1 wherein the singularity handler further comprises a velocity limiter activable in response to detecting said singularity to compute a permitted joint position change, such that the maximum predetermined velocity for each of said joints is not exceeded.

4. The trajectory generation system of claim 1 further including a glide path determiner operable to compute an estimated stopping position based upon using full joint deceleration from current joint velocities.

5. The trajectory generation system of claim 1 further comprising a plurality of state vectors such that a trajectory is defined, and further comprising a weave determiner operable to superpose a predetermined waveform upon the trajectory thereby forming a first weave direction, wherein the weave determiner computes a rotation matrix for rotating from the first weave direction to a new weave direction.

6. The trajectory generation system of claim 1 further comprising a reduced order system determiner activable, in response to detecting a robot having less than six independent joints, to modify the Jacobian matrix such that a row is ignore, resulting in a square Jacobian defining the relationship between the manipulator Cartesian velocities vector and the manipulator joint velocities vector.

7. A trajectory generation system to operate a robot in response to a motion command, said robot having a manipulator and an end-effector that traverses an actual trajectory, said manipulator including a plurality of joints, each having a position, velocity, and acceleration, said end-effector having a position and an orientation, the generation system comprising:
   a Cartesian trajectory generator operable to convert the motion command into a requested Cartesian positions vector and a requested Cartesian velocities vector;
   a Jacobian matrix of the manipulator defining the relationship between a manipulator joint velocities vector and a manipulator Cartesian velocities vector; and
   an inverse of the Jacobian matrix operable to calculate a requested joint velocities vector based upon the requested Cartesian velocities vector;
   an inverse kinematics module operable to calculate a requested joint positions vector based upon the requested Cartesian positions vector;
   a speed scaleback module activable, in response to detecting a predicted joint speed limit violation, to compute a constrained path speed such that the joint velocity of each manipulator joint does not exceed a predetermined maximum velocity and the constrained path speed maintains a planned path; and
   a singularity handler activable, in response to detecting a singularity, to constrain the motion of the robot manipulator through the singularity such that the joint velocity of each joint of the manipulator does not exceed a predetermined maximum velocity;
   said singularity handler comprising a null space mover activable, in response to detecting a singularity, to perform a move in a null space of the Jacobian matrix, such that the aligned joints are moved to a position where said joints can exit the singularity smoothly and the position and orientation of the end-effector are not affected.

8. The trajectory generation system of claim 7, wherein the singularity handler further comprises a velocity limiter activable in response to detecting said singularity to compute a permitted joint position change, such that the maximum predetermined velocity for each of said joints is not exceeded.

9. The trajectory generation system of claim 7 further including a glide path determiner operable to compute an estimated stopping position based upon using full joint deceleration from current joint velocities.

10. The trajectory generation system of claim 7 further comprising a plurality of state vectors such that a trajectory is defined, and further comprising a weave determiner operable to superpose a predetermined waveform upon the trajectory thereby forming a first weave direction, wherein the weave determiner computes a rotation matrix for rotating from the first weave direction to a new weave direction.

11. The trajectory generation system of claim 7 further comprising a reduced order system determiner activable, in response to detecting a robot having less than six independent joints, to modify the Jacobian matrix such that a row is ignore, resulting in a square Jacobian defining the relationship between the manipulator Cartesian velocities vector and the manipulator joint velocities vector.

12. A method of generating an actual trajectory for a robotic manipulator, where the robotic manipulator includes an end effector, having a position and an orientation, and a plurality of joints, each joint having a position, velocity and acceleration, comprising:
   receiving a motion request;
   converting the motion request to a requested Cartesian motion including a requested Cartesian position vector and a requested Cartesian velocity vector;
   computing a requested joint velocity vector from the requested Cartesian velocity vector with an inverse Jacobian matrix, wherein a Jacobian matrix for the robotic manipulator defines the relationship between a manipulator joint velocities vector and a manipulator Cartesian velocities vector;
   computing a requested joint position vector from the requested Cartesian position vector by means of inverse kinematics; and
   defining a planned state vector with the requested joint velocity vector and the requested joint position vector;
   detecting a singularity condition, prior to moving the robotic manipulator in accordance with the planned state vector; and
   constraining the movement of the robotic manipulator, such that the joint velocity of each joint of the robotic manipulator does not exceed a predetermined maximum velocity, wherein the movement in performed in a null space of the Jacobian matrix, thereby aligning the joints without affecting the position and orientation of the end-effector of the robotic manipulator.

\* \* \* \* \*

UNITED STATES PATENT AND TRADEMARK OFFICE
CERTIFICATE OF CORRECTION

PATENT NO. : 6,317,651 B1
DATED : November 13, 2001
INVENTOR(S) : Michael D. Gerstenberger et al.

It is certified that error appears in the above-identified patent and that said Letters Patent is hereby corrected as shown below:

Title page,
Item [56], References Cited, U.S. PATENT DOCUMENTS, "5,435,489" should be -- 5,434,489 --
Item [57], ABSTRACT,
Line 2, "is a" should be -- has a --

Column 8,
Line 56, "in performed" should be -- is performed --

Signed and Sealed this

Fourteenth Day of January, 2003

JAMES E. ROGAN
*Director of the United States Patent and Trademark Office*